United States Patent Office 2,912,423
Patented Nov. 10, 1959

2,912,423

POLYMERIZATION PROCESS

Edwin F. Peters, Lansing, and Bernard L. Evering, Chicago, Ill., assignors to Standard Oil Company, Chicago, Ill., a corporation of Indiana No Drawing. Application September 30, 1954
Serial No. 459,552

21 Claims. (Cl. 260—94.9)

This invention relates to a novel catalytic process for the conversion of ethylene to normally solid polymers. In one aspect, this invention relates to a process for the conversion of ethylene to normally solid hydrocarbonaceous materials by contacting ethylene with a catalytic mixture prepared by admixing an $AlR_3$ compound with an acidic catalyst comprising essentially a major proportion of silica and a minor proportion of alumina under suitable polymerization conditions, and separating the products thus produced. In the $AlR_3$ compound, R is selected from the class consisting of hydrogen and monovalent hydrocarbon radicals.

One object of our invention is to provide novel catalysts for the preparation of normally solid polymers from ethylene-containing gas mixtures. Another object is to provide a novel catalytic process for the conversion of gas mixtures comprising essentially ethylene to high molecular weight solid, resinous or plastic materials. An additional object is to provide a relatively low temperature, low pressure catalytic process for the conversion of ethylene to normally solid polymers. These and other objects and advantages of our invention will become apparent from the following description thereof.

Briefly, the inventive process comprises the conversion of ethylene to polymers including normally solid polymers by contacting ethylene simultaneously with an $AlR_3$ compound and an acidic silica-alumina type catalyst under suitable conditions of polymerization. The polymers produced by our invention melt above room temperature, they usually soften at temperatures above at least about 100° C. and some may soften at much higher temperatures, such as 135° C. or 150° C. The inventive process is effected at temperatures ranging upwardly from about 120° C. to about 200° C. or somewhat higher temperatures and ethylene partial pressures which range upwardly from atmospheric pressure to about 15,000 p.s.i., 25,000 p.s.i., or even 50,000 p.s.i. The normally solid materials produced by the catalytic conversion tend to accumulate upon and within the solid catalyst. It is desirable to supply to the reaction zone a liquid medium which serves both as a reaction medium and a solvent for the solid reaction products. Suitable liquid reaction media for polymerization include various hydrocarbons, particularly an aromatic hydrocarbon such as benzene, toluene or xylenes. The conversion of ethylene can be effected in the absence of a liquid reaction medium or solvent and the catalyst containing accumulated solid polymeric conversion products can be treated from time to time, within or outside the conversion zone, to effect removal of conversion products therefrom and, if necessary, reactivation or regeneration of the catalyst for further use.

Specific details of the invention will be described hereinafter, together with examples which are intended as illustrations of the invention.

The charging stock to the present polymerization process preferably comprises essentially ethylene. The ethylene charging stocks may contain hydrogen and hydrocarbons, as in refinery gas streams, for example, methane, ethane, propane, etc. However, it is preferred to employ as pure and concentrated ethylene charging stocks as it is possible to obtain. When the charging stock contains propylene as well as ethylene, both these olefins may contribute to the production of resinous high molecular weight products. The molar ratio of ethylene to propylene may be between about 0.1 and about 10. Other copolymerizable materials include mono-olefinic hydrocarbons such as n-butylenes, isobutylene, t-butylethylene, and the like, usually in proportions between about 1 and about 25 percent by volume, based on the volume of ethylene.

One of the catalyst components employed in the present invention is an "$AlR_3$ compound," which term is intended to include not only trivalent aluminum compounds, but also complex compounds containing $AlR_3$. In one aspect, the $AlR_3$ compound is, more specifically

wherein $R_1$, $R_2$ and $R_3$ may be the same or different monovalent radicals selected from the class consisting of hydrogen and monovalent hydrocarbon radicals. Examples of suitable R groups include an aryl radical, aliphatic hydrocarbon radical or derivative, viz. alkyl, cycloalkyl-alkyl, cycloalkenyl-alkyl, aryl-alkyl, cycloalkyl, alkyl-cycloalkyl, aryl-cycloalkyl, cycloalkyl alkenyl, alkyl-aryl or cycloalkyl-aryl radicals.

Specific examples of R groups include methyl, ethyl, n-propyl, isopropyl, isobutyl, n-amyl, isoamyl, hexyl, n-octyl, n-dodecyl, and the like; 2-butenyl, 2-methyl-2-butenyl and the like; cyclopentyl-methyl, cyclohexyl-ethyl, cyclopentyl-ethyl, methylcyclopentyl-ethyl, 4-cyclohexenyl-ethyl and the like; 2-phenylethyl, 2-phenylpropyl, β-naphthylethyl, methylnaphthylethyl, and the like; cyclopentyl, cyclohexyl, 2,2,1-bicycloheptyl, and the like; methylcyclopentyl, dimethylcyclopentyl, ethylcyclopentyl, methylcyclohexyl, dimethylcyclohexyl, ethylcyclohexyl, isoproplcyclohexyl, 5-cyclopentadienyl, and the like; phenylcyclopentyl, phenylcyclohexyl, the corresponding naphthyl derivatives of cycloalkyl groups, and the like; phenyl, tolyl, xylyl, ethylphenyl, xenyl, naphthyl, methylnaphthyl, dimethylnaphthyl, ethylnaphthyl, cyclohexyl-phenyl and other $AlR_3$ compounds of the type disclosed and suggested in German Patent 878.560.

The $AlR_3$ catalyst is advantageously employed in the form of compounds having the general formula $M(AlR_4)_n$ wherein M is a metal and $n$ is its valence, R having the definition aforesaid. The metal M is preferably an alkali metal, for example, lithium, sodium or potassium or an alkaline earth metal, namely, beryllium, magnesium, calcium, strontium or barium. When compounds containing an aluminum-hydrogen bond are employed as catalysts for olefin polymerization, they are converted during the polymerization process to aluminum alkyls. Aluminum alkyls and metallo-aluminum alkyls such as lithium aluminum alkyls exhibit substantial solubility in liquid olefin polymers under the reaction conditions and can be employed in this form in our process.

The proportion of $AlR_3$ compound which we employ with respect to the acidic silica-alumina catalyst may range from about .1 to about 50 weight percent or even more, although it is usually employed in proportions between about 5 and about 20 weight percent, for example, about 10 weight percent.

If desired, metal aluminum hydrides may be composited with the silica-alumina catalyst by various means, e.g. ball milling. Also, a solution of lithium aluminum hydride in a suitable solvent such as ethyl ether or tetrahydrofuran may be employed to impregnate a powdered or pelleted silica-alumina catalyst, followed by separation of the impregnated silica-alumina catalyst from excess solution and removal of excess solvent adhering to the catalyst, for example, by evacuation at moderate temperatures below the thermal decomposition temperature of the lithium aluminum hydride. Aluminum trialkyls or dialkyl aluminum hydrides may be dissolved in benzene or other aromatic hydrocarbon solvents for contact with the silica-alumina catalyst.

The acidic silica-alumina catalysts which we employ comprise essentially a major proportion by weight of silica and a minor proportion by weight of alumina. The proportion of alumina in the catalysts may range from about 1 to about 45 weight percent and is usually between about 1 and about 15 weight percent, or about 10 weight percent. The acidic silica-alumina type catalysts are well known articles of commerce, finding large commercial use in the catalytic cracking of hydrocarbon oils such as gas oils to produce gasoline. The specific compositions and properties of these catalysts have been the subject of voluminous literature, including the following: A. G. Oblad et al., "Chemical Characteristics and Structure of Cracking Catalysts" in "Advances in Catalysis" (Academic Press, Inc., New York, N.Y., 1951), volume III; R. C. Hansford, "Chemical Concepts of Catalytic Cracking," and H. E. Ries, Jr., "Structure and Sintering Properties of Cracking Catalysts and Related Materials," both in volume IV of "Advances in Catalysis." The chemical compositions of various commercial silicious acidic cracking catalysts are supplied in the publication by Dr. Ries, page 94. The acidity of solid materials can conveniently be determined by the method of Cheves Walling, J. Am. Chem. Soc. 72, 1164–8 (March 1950).

The acidic silica-alumina catalysts may be synthetic composites or they may be montmorillonitic clays, such as Super Filtrol or the like. The clays are usually sold in commerce as the products of an acid treatment which functions to activate them, and may also be sold as fluorided materials. The silicious base may be activated by the inclusion of more than one activating oxide, for example, as in silica-alumina-zirconia and silica-alumina-thoria catalysts.

In one desirable method of preparing a highly active catalyst, the acidic silicious catalyst may be first subjected to a treatment which will serve to remove substantially all of the water which is not chemically bound within the catalyst. Suitable dehydration treatments are well-known in the art and include, for example, a calcination of the catalyst at temperatures ranging between about 200° C. and about 600° C., preferably while evacuating the catalyst at pressures of the order of 1 to 10 mm. of mercury or even less for a suitable period of time to effect substantial dehydration, for example, between about 10 and about 100 minutes. The substantially dehydrated silica-alumina catalyst may then be cooled down to the desired polymerization temperature in air or in an atmosphere of nitrogen, hydrogen, or the like gases before use in polymerization.

The silica-alumina catalysts can be employed in various forms and sizes, e.g., as powder, granules, microspheres, broken filter cake, lumps, or shaped pellets. A convenient form in which the catalysts may be employed is as granules of about 20–100 mesh/inch size range.

It is desirable to minimize or avoid the introduction of oxygen, carbon dioxide, water or sulfur compounds into contact with the mixed catalysts.

In general, the polymerization of ethylene to produce normally solid polymers can be effected at temperatures within the range of about 120° C. and about 250° C. Increasing the polymerization temperature tends generally to reduce the average molecular weight of the solid polymers produced by the present process. Usually polymerization is effected in the present process at temperatures between about 100° C. and about 200° C. or, especially when moderate pressures of the order of about 500 to about 5000 p.s.i. are employed, at temperatures between about 125° C. and about 175° C.

A remarkable advantage of the process of the present invention is the fact that ethylene can be polymerized to high molecular weight, normally solid polymers even at relatively low pressures, whereas the commercial processes employing oxygen or peroxide catalysts require pressures in excess of about 15,000 p.s.i., ranging as high as about 50,000 p.s.i., to produce solid polymers. The ethylene partial pressure in the present process may range upwardly from atmospheric pressure. A generally useful and economically desirable ethylene partial pressure range in the present process lies between about 500 and about 5000 p.s.i., for example, about 1000 to about 2000 p.s.i.

The contact time or space velocity employed in the polymerization process will be selected with reference to the other process variables, catalysts, the specific type of product desired and the extent of ethylene conversion desired in any given run or pass over the catalyst. In general, this variable is readily adjustable to obtain the desired results. In operations in which the olefin charging stock is caused to flow continuously into and out of contact with the solid catalyst, suitable liquid hourly space velocities are usually selected between about 0.1 and about 10 volumes, preferably about 0.5 to 5 or about 2 volumes of olefin solution in a liquid reaction medium, which is usually an aromatic hydrocarbon such as benzene, xylenes or tetralin, or a cycloaliphatic hydrocarbon, such as decalin (decahydronaphthalene). The amount of ethylene in such solutions may be in the range of about 2 to 50% by weight, preferably about 2 to about 10 weight percent or, for example, about 5 to 10 weight percent. When the ethylene concentration in the liquid reaction medium is decreased below about 2 weight percent, the molecular weight and melt viscosity of the polymeric products drop sharply. The rate of ethylene polymerization tends to increase with increasing concentration of the ethylene in the liquid reaction medium. However, the rate of ethylene polymerization to form high molecular weight, normally solid polymers is preferably not such as to yield said solid polymers in quantities which substantially exceed the solubility thereof in said liquid reaction medium under the reaction conditions, usually up to about 5–7 weight percent, exclusive of the amounts of polymeric products which are selectively adsorbed by the catalyst. Although ethylene concentrations above 10 weight percent in the liquid reaction medium may be used, the resultant solutions of ethylene polymer in the reaction medium become very viscous and difficult to handle and severe cracking or spalling of the solid catalyst particles or fragments may occur, resulting in catalyst carry-over as fines with the solution of polymerization products and extensive loss of catalyst from the reactor.

In batch operations, operating periods of between one-half and about 10 hours, usually between about 1 and about 4 hours, are employed and the reaction autoclave is charged with olefin as the pressure falls as a result of the olefin conversion reaction.

Ethylene can be polymerized in the gas phase and in the absence of a liquid reaction medium by contact with catalysts produced by admixing an $AlR_3$ compound with silica-alumina catalysts. Upon completion of the desired polymerization reaction it is then possible to treat the solid catalyst for the recovery of the solid polymerization products, for example by extraction with suitable solvents. However, in the interests of obtaining increased rates of ethylene conversion and of continuously removing solid conversion products from the catalyst, it is desirable to effect the conversion of ethylene in the presence of a suitable liquid reaction medium. The liquid reaction medium can also be employed as a means of contacting the ethylene with catalyst by preparing a solution of the ethylene in the liquid reaction medium and contacting the resultant solution with the polymerization catalyst. Even when a liquid reaction medium is employed, high molecular weight, normally solid polymers of ethylene are tenaciously adsorbed within the pores of the silica-alumina catalyst and can only be recovered therefrom by continued extraction with suitable solvents.

Various classes of individual hydrocarbons or their mixtures which are liquid and substantially inert under the polymerization reaction conditions of the present process can be employed. Members of the aromatic hydrocarbon series, particularly the mononuclear aromatic hydrocarbons, viz. benzene, toluene, xylenes, mesitylene and xylene-p-cymene mixtures can be employed. Tetrahydronaphthalene can also be employed. In addition, we can employ such aromatic hydrocarbons as ethylbenzene, isopropylbenzene, n-propylbenzene, sec-butylbenzene, t-butylbenzene, ethyltoluenes, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydroforming operations as distillates or bottoms, from cycle stock fractions of cracking operations, etc.

We can also employ certain alkyl naphthalenes which are liquid under the polymerization reaction conditions, for example, 1-methylnaphthalene, 2-isopropylnaphthalene 1-n-amylnaphthalene and the like, or commercially produced fractions containing these hydrocarbons.

Certain classes of aliphatic hydrocarbons can also be employed as a liquid hydrocarbon reaction medium in the present process. Thus, we can employ various saturated hydrocarbons (alkanes and cycloalkanes) which are liquid under the polymerization reaction conditions and which do not crack substantially under the reaction conditions. Either pure alkanes or cycloalkanes or commercially available mixtures, freed of catalyst poisons, can be employed. For example, we can employ straight run naphthas or kerosenes containing alkanes and cycloalkanes. Specifically, we can employ liquid or liquefied alkanes such as n-pentane, n-hexane, 2,3-dimethylbutane, neohexane, n-octane, isooctane (2,2,4-trimethylpentane), n-decane, n-dodecane, cyclohexane, methylcyclohexane, dimethylcyclopentane, ethylcyclohexane, decalin, methyldecalins, dimethyldecalins and the like.

We can also employ a liquid hydrocarbon reaction medium comprising liquid olefins, e.g., n-hexenes, cyclohexene, octenes, hexadecenes and the like.

The normally solid polymerization products which are retained on the catalyst surface or grease-like ethylene polymers can themselves function to some extent as a liquefied hydrocarbon reaction medium, but it is highly desirable to add a viscosity reducing hydrocarbon, such as those mentioned above, thereto in the reaction zone.

The liquid hydrocarbon reaction medium should be freed of poisons by acid treatment, e.g., with anhydrous p-toluenesulfonic acid, sulfuric acid, phosphoric acid or by equivalent treatments, for example with aluminum halides, or other Friedel-Crafts catalysts, maleic anhydride, calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of such treatments.

C.P. xylenes can be purified by refluxing with a mixture of $MoO_3$—$Al_2O_3$ catalyst and $LiAlH_4$ (50 cc. xylene—1 g. catalyst—0.2 g. $LiAlH_4$) at atmospheric pressure, followed by distillation of the xylenes. Still more effective purification of solvent can be achieved by heating it to about 225–250° C. with either sodium and hydrogen or NaH in a pressure vessel.

Temperature control during the course of the ethylene conversion process can be readily accomplished owing to the presence in the reaction zone of a large liquid mass having relatively high heat capacity. The liquid hydrocarbon reaction medium can be cooled by heat exchange inside or outside the reaction zone. It should be noted, however, that in some instances the solvent can be present as a dense gas phase.

When solvents such as xylenes are employed some slight alkylation thereof by ethylene can occur under the reaction conditions. Propylene is a far more reactive alkylating agent than ethylene and when propylene is present in the feed, it is desirable to employ a non-alkylatable solvent such as decalin. The alkylate is removed with grease in the present process, can be separated therefrom by fractional distillation and can, if desired, be returned to the polymerization zone.

The solvent:catalyst weight ratio can be varied in the range of about 5 to about 3000, or even higher for flow systems. The employment of high solvent:catalyst ratios, which is rendered possible by the presence of an $AlR_3$ compound in the reaction zone, is very important in obtaining high yields of polymer.

In the following table are included data specifically illustrating the process of this invention, but it is not intended that the exemplary operations should function unnecessarily to delimit the scope of the present invention. The specific examples of ethylene polymerization were performed in a high pressure rocker bomb of carbon steel, having 300 cc. capacity.

The catalyst contained about 85.5 weight percent of silica, about 14.5 weight percent of alumina and very small proportions of iron oxide and other heavy metal oxides and volatile materials. The catalyst was employed in the form of a powder, all of which passed through a screen of 40 mesh per inch and 51% through a screen of 200 mesh per inch. The apparent bulk density of the catalyst was 0.55 gram per cc.

The reactor was, in most instances, charged under an inert atmosphere with a commercial C.P., thiophene-free benzene, the silica-alumina catalyst and the $AlR_3$ component of the catalyst. Commercial lithium aluminum hydride was employed as a mixture of lumps and fines. Aluminum triethyl was employed in the form of a solution in benzene. The mixture of catalysts and solvent was then heated, with agitation, to the reaction temperature and the reactor was then presured with 99.5 weight percent purity ethylene containing about 21 parts per million of oxygen, 341 parts per million of carbon dioxide and some ethane.

The liquid products of reaction were taken as materials boiling in the range of 25° C. to about 200° C., free of benzene solvent. The solid polymers were found to be adsorbed by the solid catalysts, from which they were partially extracted with xylenes at the boiling point. In some instances, lithium aluminum hydride or its derivatives were destroyed by treatment with ethanol, followed by water, prior to xylenes extraction of the catalyst to recover some of the adsorbed, normally solid polymerization products. The yield of solid ethylene polymers was determined from the gain in weight of the catalyst, in each instance.

The reported specific viscosities (Staudinger) are defined as relative viscosity minus one, and relative viscosity is defined as the ratio of the time of efflux of a solution of 0.200 g. polymer in 100 cc. (0.254 wt. percent) of C.P. xylenes at 110° C. from the viscosimeter as compared with the time of efflux of 100 cc. of C.P. xylenes at 110° C. In some instances, the specific viscosities were determined upon 0.125 weight percent solutions of the solid polyethylenes in xylenes.

The principal purpose of the catalyst pretreatments shown in the table was to produce substantially dry catalysts, since water destroys the $AlR_3$ compounds.

It will be noted from run 1 that the catalytic composition of lithium aluminum hydride and silica-alumina effected the conversion of ethylene in high yield at low temperatures to normally solid polymers. The melt viscosity of the extracted solid polymers was $6.6 \times 10^7$ (method of Dienes and Klemm, J. Appl. Phys. 17, 458–71 (1946)). The remaining polymer contained within the catalyst is

Table

| Run No. | 1 | 2 | 3 | 4 | 5 | 6 | 7 | 8 |
|---|---|---|---|---|---|---|---|---|
| Charge, g.: | | | | | | | | |
| Catalyst, $SiO_2$—$Al_2O_3$ | 26 | 21 | 56 | | 24($Al_2O_3$) | 22 | 22 | 21 |
| $LiAlH_4$ | 2 | | | 4.5 | 1.6 | 1.6 | 2 | 1.4 |
| Other | | | | | | | | |
| Ethylene | 23 | 21 | 74 | 32 | 35 | 45 | 14 | 29 |
| Benzene | 88 | 132 | 219 | 88 | 88 | 88 | 88 | 88 |
| Siliceous Catalyst Pretreatment: | | | | | | | | |
| Heating— | | | | | | | | |
| Temp., °C | 350 | 343 | 343 | | 350 | 350 | 350 | 130 |
| Press., mm. Hg | 1 | 1 | 1 | | 1 | 1 | 1 | 1 |
| Time, hrs | 1 | 1 | 1 | | 1 | 1 | 2 | 24 |
| Gas Treating— | | | | | | | | |
| Gas | $N_2$ | $N_2$ | $H_2$ | | $H_2$ | $H_2$ | $H_2$ | |
| Temp., °C | 350–150 | 343 | 343 | | 350–150 | 350–193 | 350–150 | |
| Press., p.s.i. | 1,000 | 600 | 1,500 | | 1,000 | 1,000 | 1,000 | |
| Time, hrs | | 1 | 1 | | | | | |
| Polymerization Conditions: | | | | | | | | |
| Temp., °C | 150 | 150 | 150 | 146 | 150 | 193 | 150 | 121 |
| Press., p.s.i. | 1,109 | 1,000 | 1,000 | 1,000 | 1,000 | 1,040 | 400 | 1,200 |
| Time, hrs | 4 | 4 | 5 | 4 | 4 | 2 | 4 | 3 |
| Products Produced, g.: | | | | | | | | |
| Gaseous | 0 | 0 | 0 | 0 | 0 | 0 | 0 | 0 |
| Liquid, $C_{5+}$ | 0 | 12 | 135 | 8 | 10 | 35 | 3 | 6 |
| Solid | 10 | | | 0 | 0 | 0.1 | 6 | 7 |
| Total | 10 | 12 | 135 | 8 | 10 | 35.1 | 9 | 13 |
| Wt. percent Ethylene Conversion | 43 | 19 | 67 | 25 | 29 | 78 | 64 | 45 |
| Spec. Viscosity of Solids×$10^5$ at 0.254 w. percent [1] | 16,000 | | | | | 11,000 | 14,144 | 53,000 |

| Run No. | 9 | 10 | 11 | 12 | 13 | 14 | 15 | 16 | 17 |
|---|---|---|---|---|---|---|---|---|---|
| Charge, g.: | | | | | | | | | |
| Catalyst, $SiO_2$—$Al_2O_3$ | 23($SiO_2$—MgO) | 48 | 21 | 20 | 20 | 24 | 24 | 20 | 20 |
| $LiAlH_4$ | 3.5 | 0.0 | 1.4 | 1.4 | [3] 2.0 | [4] 3.5 | [4] 5.5 | | |
| Other | | | | | | | | [5] 2.9 | 1.4 (LiBH$_4$) |
| Ethylene | 69 | 26 | 32 | 20 | 24 | 32 | 10 | 36 | 58 |
| Benzene | 88 | 0 | 88 | 0 | 0 | 173 | 195 | 87 | 88 |
| Siliceous Catalyst Pretreatment: | | | | | | | | | |
| Heating— | | | | | | | | | |
| Temp., °C | 350 | [2] 510 | [2] 510 | [2] 510 | [2] 510 | [2] 510 | [2] 510 | [2] 510 | [2] 510 |
| Press., mm. Hg | 1 | 760 | 760 | 760 | 760 | 760 | 760 | 760 | 760 |
| Time, hrs | 1 | 4 | 2 | 3 | 4 | 12 | 12 | 12 | 4 |
| Gas Treating— | | | | | | | | | |
| Gas | $H_2$ | | | | | | | | |
| Temp., °C | 350–177 | | | | | | | | |
| Press., p.s.i. | 1,000 | | | | | | | | |
| Time, hrs | 1 | | | | | | | | |
| Polymerization Conditions: | | | | | | | | | |
| Temp., °C | 177 | 150 | 150 | 150 | 150 | 150 | 150 | 152 | 150 |
| Press., p.s.i. | 1,000 | 1,100 | 1,000 | 1,000 | 1,000 | 1,200 | 1,000 | 1,000 | 1,000 |
| Time, hrs | 3 | 4 | 3 | 3 | 4 | 3 | 5 | 7 | 4 |
| Products Produced, g.: | | | | | | | | | |
| Gaseous | 0 | 0 | 0 | 0 | 0 | 0.5 | 0 | 0 | 0 |
| Liquid, $C_{5+}$ | 59 | 5 | 3 | 0.2 | 2 | 5.0 | 0 | 0 | 61 |
| Solid | 0 | 0 | 18 | 3.5 | 0 | 7.0 | 4 | 14 | 1 |
| Total | 59 | 5 | 21 | 3.7 | 2 | 12.0 | 4 | 14 | 62 |
| Wt. percent Ethylene Conversion | 86 | 19 | 70 | 19 | 8 | 37 | 40 | 39 | 70 |
| Spec. Viscosity of Solids×$10^5$ at 0.254 w. percent [1] | | | 109,812 | 55,490 | | | | | 45,598 |
| Spec. Viscosity of Solids×$10^3$ at 0.125 w. percent | | | | | | 41,500 | Insol. | Insol. | |

[1] Viscosities were run on the 2–10% extractable polymer.
[2] The siliceous catalyst was dried in a muffle furnace and then allowed to cool in air to reaction temperature.
[3] $LiAlH_4$ physically separated from $SiO_2$—$Al_2O_3$.
[4] $LiAlH_4$ reacted separately with 100 p.s.i.g. ethylene in presence of benzene at 120 to 150° C. to make lithium aluminum alkyl solution.
[5] Promoter is aluminum triethyl.

undoubtedly of substantially higher molecular weight and specific viscosity.

Run 2 should be compared with run 1. In run 2 no lithium aluminum hydride was used and the silica-alumina catalyst was pretreated with nitrogen before use. The liquid products consisted of ethylbenzene, diethylbenzenes and triethylbenzenes. No solid polymers whatsoever were formed. Run 3 differed principally from run 2 in that the catalyst was pretreated with hydrogen, which resulted in a substantial increase in the alkylation activity of the catalyst, since the liquid products were found to be ethylated benzenes, but again no solid polymer was formed.

In run 4 lithium aluminum hydride alone was employed as the catalyst and only liquid polymers of ethylene were produced. This was, likewise, true when lithium aluminum hydride was employed together with an activated adsorptive alumina (run 5).

In run 6 lithium aluminum hydride was employed with silica-alumina at a relatively high temperature, viz. 193° C., which, at the relatively low ethylene pressure which was employed, yielded normally solid polymer in reduced amounts as compared with run 1. However, it will be noted that the product of run 6 which was extracted from the catalyst had a rather high specific viscosity.

In run 7 ethylene was polymerized at the relatively low pressure of 400 p.s.i. with lithium aluminum hydride and silica-alumina to produce a high yield of high specific viscosity solid polymer.

In run 8 a lithium aluminum hydride-silica-alumina catalyst was successfully employed for the preparation of normally solid polyethylenes at the relatively low temperature of 121° C.

In run 9 lithium aluminum hydride was used together with a catalyst comprising about 82 weight percent silica and 18 weight percent magnesia. The only polymerization products were liquids, demonstrating the specificity of the alumina component in the present process for the manufacture of normally solid polymers from ethylene.

In run 10 the silica-alumina catalyst was employed without the addition of lithium aluminum hydride or other promoter and was pretreated by heating in a muffle furnace and allowing it to cool in air. No solid polymers of ethylene were produced.

In run 11 and the remaining series of runs, the silica-alumina catalyst was calcined in a muffle furnace under the tabulated conditions and allowed to cool in air to the reaction temperature. A catalyst thus calcined was successfully employed with lithium aluminum hydride and benzene solvent for the polymerization of ethylene in run 11. Run 12 was substantially a duplicate of run 11 except that the benzene solvent was omitted, resulting in a much lower ethylene conversion and a somewhat reduced specific viscosity of the polymer which was extracted from the partially spent catalyst.

Run 13 demonstrates the necessity of admixing the lithium aluminum hydride or other similar catalyst with the silica-alumina catalyst. In run 13 the lithium aluminum hydride was placed in a stainless steel wire basket which was attached to the top cover of the autoclave and was thus separated physically from the silica-alumina catalyst. No reaction solvent was employed. Under these conditions only a very low conversion of ethylene, exclusively to liquid products, was obtained.

In runs 14 and 15, the silica-alumina catalyst was employed with a solution of lithium aluminum alkyls prepared in a separate reactor as follows. A mixture of 300 cc. of purified benzene and 3.5 g. of lithium aluminum hydride was prepared in a stainless steel-lined rocking autoclave and the mixture was maintained under ethylene pressure of 1000 p.s.i. at temperatures in the range of about 120 to 150° C. for 2 hours. The resultant solution of lithium aluminum alkyls in benzene, probably predominantly lithium aluminum tetraethyl, was pressured by purified hydrogen gas through a stainless steel filter (to remove any unreacted lithium aluminum hydride particles which might have remained after the reaction) into the polymerization autoclave containing the silica-alumina catalyst and ethylene under pressure. About 100 cc. of the lithium aluminum alkyl solution was added in each instance to the polymerization reactor. Although it was noted that no appreciable pressure drop occurred upon contact of the ethylene with the silica-alumina catalyst in the polymerization reactor, the addition of the benzene solution of lithium aluminum alkyls caused a rapid drop in the partial pressure of ethylene in the polymerization zone, necessitating further addition of ethylene thereto. In each of runs 14 and 15 substantial conversions of ethylene were obtained. The solid polyethylenes produced in run 15 must have been of extremely high molecular weight, since they were so slightly soluble in boiling xylenes that it was impossible to determine the specific viscosity.

Run 16 demonstrates the successful employment of a typical aluminum alkyl, viz. aluminum triethyl, in benzene with the silica-alumina catalyst to afford a substantial conversion of ethylene exclusively to normally solid polymers of very high molecular weight.

In run 17, a $LiBH_4$—$SiO_2$—$Al_2O_3$ catalyst combination was found to yield mostly liquid ethylene polymers and a small amount of solid polyethylenes.

The acidic silica-alumina catalysts which comprise essentially a major proportion by weight of silica may contain, in addition to alumina, a minor proportion by weight of an oxide of magnesium or of a metal selected from groups 3b and 4a of the periodic table, e.g., oxides of boron, titanium, zirconium, etc. Also, hydrides of Be, Mg and B or their hydrocarbon derivatives may be used with or in lieu of the aluminum compounds described above.

For large-scale operations, the process described in application for United States Letters Patent, Serial No. 324,608 of Edmund Field and Morris Feller, filed December 6, 1952, can be employed.

The polymers produced by the process of this invention can be subjected to such after-treatment as may be desired, to fit them for particular uses or to impart desired properties. Thus, the polymers can be extruded, mechanically milled, filmed or cast, or converted to sponges or latices. Antioxidants, stabilizers, fillers, extenders, plasticizers, pigments, insecticides, fungicides, etc. can be incorporated in the polyethylenes and/or in by-product alkylates or "greases." The polyethylenes may be employed as coating materials, binders, etc. to even a wider extent than polyethylenes made by prior processes.

The polymers produced by the process of the present invention, especially the polymers having high specific viscosities, can be blended with the lower molecular weight polyethylenes to impart stiffness or other desired properties thereto. The solid resinous products produced by the process of the present invention can, likewise, be blended in any desired proportions with hydrocarbon oils, waxes such as paraffin or petrolatum waxes, with ester waxes, with high molecular weight polybutylenes, and with other organic materials. Small proportions between about .01 and about 1 percent of the various polymers of ethylene produced by the process of the present invention can be dissolved or dispersed in hydrocarbon lubricating oils to increase V.I. and to decrease oil consumption when the compounded oils are employed in motors; larger amounts of polyethylenes may be compounded with oils of various kinds and for various purposes.

The products having a molecular weight of 50,000 or more produced by the present invention, can be employed in small proportions to substantially increase the viscosity of fluent liquid hydrocarbon oils and as gelling agents for such oils. The solution of about 1 gram of an ethylene polymer produced by this invention, having a specific viscosity $\times 10^5$ of about 50,000 in about one liter of xylenes at a temperature close to the boiling point produced an extremely viscous solution.

The polymers produced by the present process can be subjected to chemical modifying treatments, such as halogenation, halogenation followed by dehalogenation, sulfohalogenation by treatment with sulfuryl chloride or mixtures of sulfur dioxide and chlorine, sulfonation, and other reactions to which hydrocarbons may be subjected.

Having thus described our invention, what we claim is:

1. A process for the conversion of ethylene to a normally solid polymer, which process comprises contacting ethylene with a catalytic mixture prepared by the process which consists of admixing an $AlR_3$ compound in which the R groups are selected from the class consisting of hydrogen and monovalent hydrocarbon radicals with a silica-alumina catalyst consisting essentially of a major proportion of silica and a minor proportion of alumina, effecting said contacting at an effective polymerization temperature between about 120° C. and about 250° C., and recovering a normally solid polymer thus produced.

2. A process for the conversion of ethylene to a normally solid polymer, which process comprises contacting ethylene with a catalytic mixture prepared by the process which consists of admixing an alkyl aluminum hydride with an acidic silica-alumina catalyst consisting essentially of a major proportion of silica and a minor proportion of alumina, effecting said contacting at an effective polymerization temperature between about 120° C. and about 250° C., and recovering a normally solid polymer thus produced.

3. The process of claim 2 wherein said alkyl aluminum hydride is diethyl aluminum hydride.

4. A process for the conversion of ethylene to a normally solid polymer, which process comprises contacting ethylene with a catalytic mixture prepared by the process which consists of admixing an aluminum trialkyl with an acidic silica-alumina catalyst consisting essentially of a major proportion of silica and a minor proportion of alumina, effecting said contacting at an effective polymerization temperature between about 120° C. and about 250° C., and recovering a normally solid polymer thus produced having a Staudinger specific viscosity $\times 10^5$ of at least about 11,000 when measured in solution in xylenes at 0.254 weight percent polymer concentration at 110° C.

5. The process of claim 4 wherein said aluminum trialkyl is aluminum triethyl.

6. A process for the conversion of ethylene to a normally solid polymer, which process comprises contacting ethylene with a catalytic mixture prepared by the process which consists of admixing a metal aluminum alkyl with an acidic silica-alumina catalyst consisting essentially of a major proportion of silica and a minor proportion of alumina, effecting said contacting at an effective polymerization temperature between about 120° C. and about 250° C., and recovering a normally solid polymer thus produced.

7. The process of claim 6 wherein said metal aluminum alkyl is an alkali metal aluminum alkyl.

8. The process of claim 7 wherein said alkali metal aluminum alkyl is a lithium aluminum tetralkyl.

9. A process for the conversion of ethylene to a normally solid polymer, which process comprises contacting ethylene with a catalytic mixture prepared by the process which consists of admixing an alkali metal aluminum hydride with an acidic silica-alumina catalyst consisting essentially of a major proportion of silica and a minor proportion of alumina, effecting said contacting at an effective polymerization temperature between about 120° C. and about 250° C., and recovering a normally solid polymer thus produced.

10. The process of claim 9 wherein said temperature is between about 125° C. and about 175° C.

11. The process of claim 9 wherein said contacting is effected in the presence of a liquid hydrocarbon reaction medium.

12. The process of claim 11 wherein said medium is a liquid monocyclic aromatic hydrocarbon.

13. The process of claim 9 wherein said alkali metal aluminum hydride is lithium aluminum hydride.

14. The process of claim 9 wherein said alkali metal aluminum hydride is sodium aluminum hydride.

15. A process for the conversion of ethylene to a normally solid polymer, which process comprises contacting ethylene with a catalytic mixture prepared by the process which consists of admixing lithium aluminum hydride with an acidic silica-alumina catalyst consisting essentially of a major proportion of silica and between about 1 and about 15% by weight of alumina, effecting said contacting in the presence of a low boiling aromatic hydrocarbon at a polymerization temperature between about 125° C. and about 175° C. under a pressure of at least about 500 p.s.i., and recovering a normally solid polymer thus produced.

16. The process of claim 15 wherein said hydrocarbon is benzene.

17. The process of claim 15 wherein said silica-alumina catalyst is subjected to a dehydrating heat treatment before use thereof in said process.

18. The process of claim 15 wherein said silica-alumina catalyst is subjected to a dehydrating heat treatment at a temperature between about 250° C. and about 550° C. at subatmospheric pressure for a period of time sufficient to effect substantial dehydration of said catalyst before use thereof in said process.

19. The process of claim 1 wherein said contacting is effected in the presence of a liquid hydrocarbon reaction medium.

20. The process of claim 19 wherein said medium is a liquid monocyclic aromatic hydrocarbon.

21. The process of claim 1 wherein said normally solid polymer is a resin having a Staudinger specific viscosity $\times 10^5$ of at least about 11,000 when measured in solution in xylenes at 0.254 weight percent polymer concentration at 110° C.

References Cited in the file of this patent

UNITED STATES PATENTS

| | | |
|---|---|---|
| 2,699,457 | Ziegler | Jan. 11, 1955 |
| 2,731,453 | Field | Jan. 17, 1956 |